Nov. 7, 1939.    G. F. HAUF    2,179,089
JOINT
Filed May 18, 1936    2 Sheets-Sheet 1
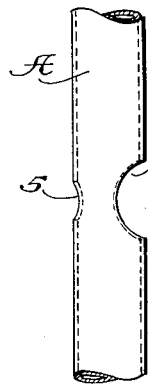
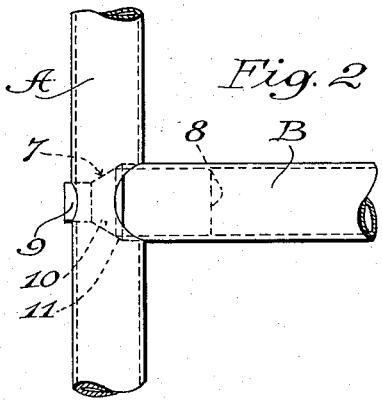
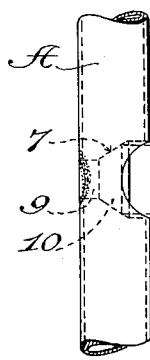
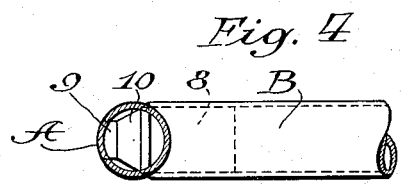
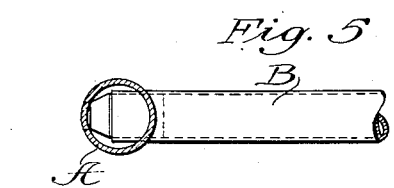
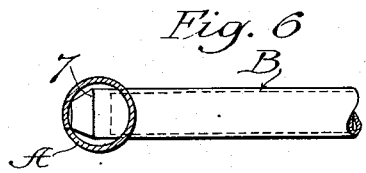
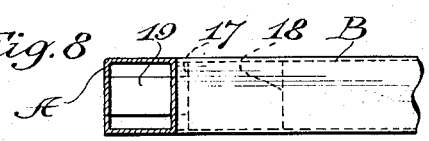
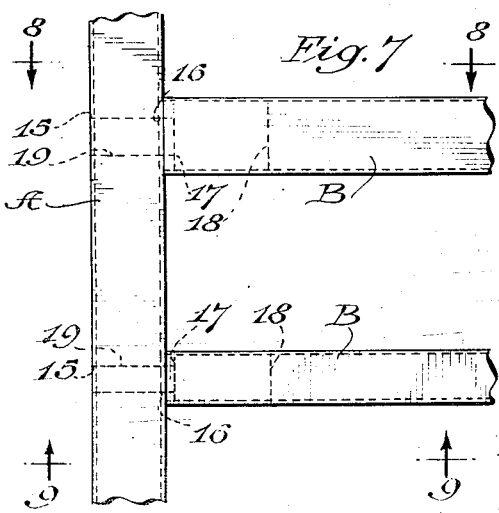
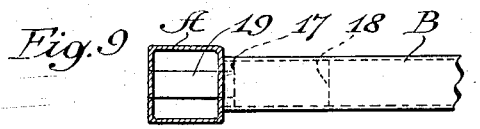
Inventor:
George F. Hauf
By Williams, Bradbury, McCaleb & Hinkle
Attys Nov. 7, 1939.    G. F. HAUF    2,179,089
JOINT
Filed May 18, 1936    2 Sheets-Sheet 2
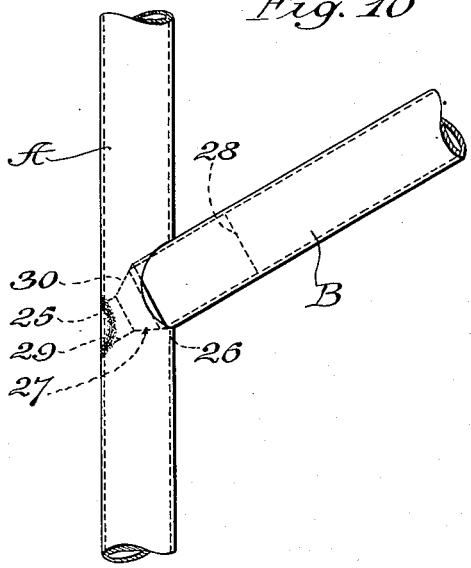
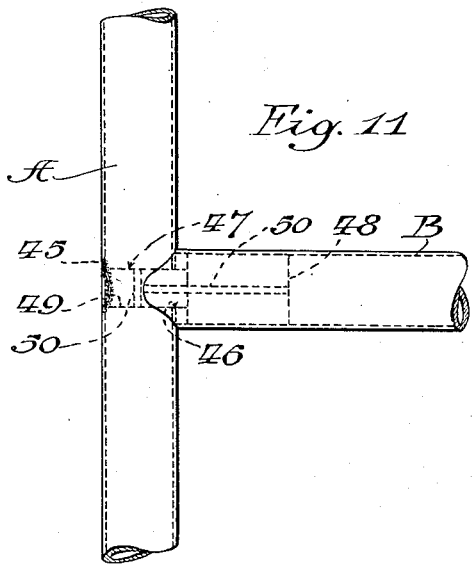
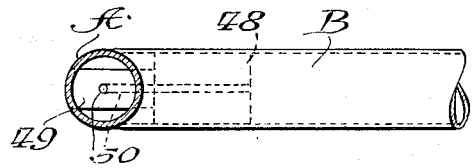
Inventor:
George F. Hauf
By Williams, Bradbury, McCaleb & Hinkle
Attys.

Patented Nov. 7, 1939

2,179,089

UNITED STATES PATENT OFFICE 2,179,089

JOINT

George F. Hauf, River Forest, Ill.

Application May 18, 1936, Serial No. 80,336

4 Claims. (Cl. 287—54)

My invention relates to joints. It is particularly applicable to the direct joinder, at an angle, of two members, such as pipes or tubing or of rods to pipes or tubing.

Heretofore, for example, in the joining, at an angle, of two pieces of cylindrical tubing it has been the practice to cut the end of one tube to conform to the correct angular projection of the surface of the other against which the end is to abut and then, after fitting the end of the cut tube to the curved outside surface of the other tube, to weld or braze or otherwise secure the tubes together along the curved line of contact or abutment between them. Not only is the proper cutting of the end of the tube and the satisfactory production of a union on such a curved line a rather difficult matter, but in order to make the junction corners even approximately sharply defined and smooth and have a finished appearance, the grinding off of the excess and extruded metal is a tedious and expensive operation. And at best, an abrupt or sharp corner along the line of contact cannot often be produced. Furthermore, such joints are weak because all of the strain to which the joint is subjected is imparted to and must be borne by only one side of the tube against which the other (i. e., the cut tube) abuts, and the removal of metal from the end of the abutting tube to make the same conform to the surface of the abutted tube weakens it.

Also, because the line of weld is long, the time heat must be applied may often be considerable, resulting in an annealing and weakening of the tubes in the region of the joint.

One of the objects of my invention is to provide a joint which may be more easily, inexpensively and satisfactorily produced than previous joints.

Another object is to provide a joint in which it is unnecessary to cut the end of the abutting member to conform to the surface of the other member.

Another object is to provide a joint in which the required amount of welding or other joining operation is reduced and can be applied or performed at a more accessible region than the line of juncture within a corner between a curved edge and a curved surface.

Another object is to provide a joint which may be quickly, easily and inexpensively finished.

A further object is to provide a joint with initially abrupt and clean corners,—requiring no grinding thereat after the union is made.

A further object is to provide a joint which is stronger in that the tubes are reinforced and strain is distributed to opposite sides of the tubes or pipes.

Another object is to provide a joint which, if desired, can be readily separated and reunited.

Another object is to provide an improved method of making joints between angularly related members,—particularly those of cylindrical or rectangular tubular shape.

Other objects and advantages will hereinafter appear.

Typical examples of joints embodying and made in accordance with my invention are illustrated in the accompanying drawings, wherein:

Fig. 1 shows, in side elevation, two pieces of cylindrical tubing of equal diameters prepared for joinder at right angles;

Fig. 2 is a similar view showing the joint with the two pieces of tubing fitted together and as it appears when the soldering or welding has been completed;

Fig. 3 is a similar view of the finished joint;

Fig. 4 is an end elevation of the finished joint;

Fig. 5 is an end elevation of a right-angle joint between two pieces of cylindrical tubing of different diameters;

Fig. 6 is an end elevation of a right-angle joint between a cylindrical tube and a cylindrical rod;

Fig. 7 is a side elevation of two right-angle joints between rectangular tubes, the upper joint being between two tubes of the same size and the lower between two tubes of different sizes;

Fig. 8 is a section on the line 8—8 of Fig. 7;

Fig. 9 is a section on the line 9—9 of Fig. 7;

Fig. 10 is a side elevation of a 60-degree joint between cylindrical tubes of the same diameter;

Figs. 11 and 12 are respectively side and end elevations of a modified permanent construction.

Throughout the following description of the typical joints which I have chosen to illustrate the applicability of my invention, the two members to be joined will be designated respectively A and B,—the member A (which, for convenience, I will term the main) being the one to the side of which the end of the other member B (which I will term the branch) is united.

Referring first to Figs. 1 to 4, the two pieces of equal diameter, cylindrical tubing A and B are to be joined at a right angle or, in other words, to form an intersecting joint of typical T form. The sides of main tube A, at the point where the end of branch tube B is to be joined thereto, are perforated with two coaxial and diametrically opposite holes 5 and 6. In other words, the common axis of the two holes through the wall of tube A is related to the axis of tube A at the angle tube B is to be joined thereto; i. e., the angle of intersection,—in this instance 90 degrees. Both holes are shaped as the projections, upon the cylindrical walls of main A, of circles lying parallel to the axis of main A. That is, preferably they are each formed by a cylindrically-shaped tool, such as an ordinary drill, applied thereto perpendicular to the tube axis and in the plane the joint is to assume. Preferably the hole 5 on the side of the main tube A opposite to which branch tube B is to be joined, is considerably smaller than hole 6. The diameter of hole 6, on a line parallel to the axis of tube A (i. e., in the plane of the joint) should be substantially the same as the outside diameter of branch tube B,—i. e., only enough greater to insure a good close fit with the end of the branch tube when, as will be hereinafter explained, the two tubes are fitted together in the formation of the joint therebetween.

Theoretically, where the two tubes are of the same size, hole 6 should extend exactly half way through main A, which would permit branch B to be inserted therein until its outer surfaces lying parallel to the plane of the joint are exactly flush or tangent with the outer surfaces of main A lying parallel to the plane of the joint. I prefer, however, to carry hole 6 slightly less than half way through main A so that, while its diameter in the plane of the joint is, as previously stated, substantially the same as (strictly speaking, very slightly greater than) the outside diameter of branch B, its diameter perpendicular to the plane of the joint is, because of the curvature of the tube, slightly less than the outside diameter of branch B. This relation, permitting the cross-section of main A where hole 6 is cut therethrough to extend on both sides of the diameter in the plane of the joint, lends strength and rigidity to main tube A in the region where it is perforated by the holes 5 and 6. And the surfaces of the two tubes lying parallel to the plane of the joint can be made so nearly flush or tangent as not to detract at all from the appearance of the finished joint.

The closer the fit between the rim or edge of hole 6 and the surface of branch B, the tighter, neater and more abrupt-cornered will be the joint. For the sake of convenience I will hereinafter call hole 6 the near hole, because it is on the side adjacent branch B, and the hole 5 will be called the far or remote hole, because it is in the wall opposite branch B. Holes of this character may be simultaneously formed by a two-stage drill,—the forward or advance section thereof, which forms far hole 5, being of a diameter less than the diameter of the rear or trailing coaxial section, which forms near hole 6, by the desired amount.

The end of branch B that is to be joined to main A is provided with a projecting metal stem which is inserted through the aligned holes in main A and secured to the wall thereof adjacent the far hole, as will be hereinafter explained. This stem may be formed as a metal plug 7 which is fitted into the end of branch B and secured there by welding, brazing or other appropriate means. Preferably the plug is formed in three integral coaxial sections; an inner cylindrical section or base 8, which fits within the bore of branch B with sufficient tightness to insure a rigid and strong union therebetween when they are welded or brazed or otherwise secured together, a smaller outer or forward cylindrical section or tip 9, the diameter of which should preferably be only slightly less than the diameter of far hole 5, and an intermediate frusto-cone shaped section 10.

In cases where, as illustrated, branch B is of the same diameter as main A—or only slightly less— a neater joint will be produced if, as shown, the end of branch B is beveled or chamfered, as at 11, so as to form, in effect, a continuation of the tapering intermediate section 10 of the stem. The frusto-cone shape of the intermediate section enables the stem to clear the inner curved wall of main tube A when the two tubes are assembled to form the joint and, by tapering the end of branch B to correspond thereto, the end of branch B may be inserted into hole 6 of main A until, when the rim of the hole at its shortest diameter contacts the end of branch B, the sides of the tubes parallel to the plane of the joint are substantially flush, as shown in Fig. 4.

The tubes are assembled to form the joint by presenting the stemmed end of branch B to the side of main A, then inserting the stem through near hole 6 and finally bringing the two tubes together in correct angular relation until the tip 9 of the stem projects into (preferably through) far hole 5 and the beveled end of branch B abuts the wall of main A, as shown in Fig. 2. In this condition the end of the branch tube in the region of the axial plane of the joint actually projects into the bore of the main tube while in the region of its axial plane normal to the plane of the joint, the end of the branch tube comes substantially flush with the surface of the main tube. With the two tubes thus assembled together, they may be permanently united by welding or brazing or soldering the forward projecting end of tip 9 of the stem to the wall of main tube section A surrounding the far hole 5 therethrough.

Now all that remains to complete the joint so that it will appear as shown in Figs. 3 and 4 is to grind off, flush with the curved surface of main A, the projecting end of stem-tip 9 and any extruded or excess metal that may have accumulated on the surface during the welding operation. This is a simple operation that may be easily, quickly and effectively performed by a curved-face grinding wheel. After the stem projection and metal accumulation have been removed and smoothed down flush with the surface of main tube A, the entire assembly may, if desired, be plated or finished as required.

In producing such a joint in the manner just described, no welding, soldering or brazing is required along the inner curved corner defining the junction between the two tubes as heretofore was the usual practice and, consequently, that corner is abrupt and sharply defined (i. e., without any fillet), clean and smooth. The only grinding and smoothing required to finish the joint are at the readily accessible exposed side of tube A opposite branch B,—operations which may be accomplished there as easily and quickly as plain surface grinding. And the joint is exceedingly strong because the stem acts like a beam between the opposite sides of main A, and strains at the joint are distributed to and resisted by both sides of that tube, instead of by one side only as heretofore. The stem also serves to reinforce branch B in the region where strain is concentrated and has the greatest tendency to break it.

Fig. 5 shows a similar joint made in the same manner between a cylindrical main tube A of one diameter and a smaller diameter branch tube B. In such a case the drill that produces near hole 6 may be fully inserted so that the end of branch B will enter completely into main A; and it is unnecessary to bevel the end of branch B to conform to the taper of the stem.

Fig. 6 shows a joint between a cylindrical main tube A and a branch B in the form of a cylindrical rod. In this instance the stem 7 is formed in the end of the solid branch rod instead of as a separate inserted piece or plug. Rod B may, if desired, be formed merely as a short stud over which a larger tube may be slipped or it may be bored out, as shown, to form a socket into which a tube or another length of rod may be inserted.

Figs. 7 to 9 show right-angle joints formed between sections of square tubing. In forming joints wherein the surface of the main tube against which the end of the other or branch tube abuts—or appears to abut—is flat, it is unnecessary to perforate a wall of the main tube with an opening corresponding to the size and shape of the branch tube. Thus, the opposite walls of main A may be perforated with diametrically aligned similar holes 15 and 16, either of which may be the near hole. Preferably these holes are of circular cross-section and of equal diameter and of a size suitable to fit rather snugly the reduced cylindrical tip 19 of a stem 17. The cross-sectional area of stem-tip 19 should preferably be considerably less than the cross-section of the smaller of the two tubes to be joined. It may be rectangular in shape like the tubes (in which event the holes 15 and 16 should also be of rectangular shape) although usually a cylindrical cross-section is to be preferred since that shape can be readily formed by turning down a bar of rectangular section and of a size to fit into the bore of the branch tube. And also because, when holes 15 and 16 are circular, they can be produced by an ordinary drilling operation. The inner enlarged section or base 18 of stem 17 is shaped and of a size quite closely to fit the bore of branch tube B (e. g., square), so that when inserted into the end of branch B like a plug it may be securely and tightly fastened there by soldering or brazing. Preferably the plug end of the stem is inserted into the bore of branch B until the forward end of its base 18 is slightly inside the end of the tube, to insure that the stem does not interfere with a close fit of the end of branch B against the side of main A. The two sections of tubing are assembled by presenting the stemmed end of branch B to the side of main A, then inserting the tip 19 of the stem projecting from the end of branch B successively through the aligned holes 16 and 15 of main A (hole 16 becoming the near hole, as it is on the side adjacent branch B) and finally bringing the end of branch B flush with or against the side of main A. In this condition the end of stem-tip 19 preferably should extend slightly beyond the wall of main A opposite the side engaged by branch B. When thus assembled, the tip 19 of stem 17 is welded or brazed to the wall of main A about far hole 15 and the union of the two tubes is made permanent. In order to finish the joint it is only necessary to grind off and polish down the projecting end of the stem flush with the side of main A through which it projects.

Fig. 10 shows a side elevation of a 60-degree joint between two cylindrical tubes. In joining cylindrical tubes at an angle other than 90 degrees, the holes 25 and 26 in main A may still be formed by a cylindrical drill,—preferably a two-stage drill having the forward section of a diameter corresponding to the diameter of the reduced tip 29 of stem 27 to form far hole 25 and a rear section of a diameter corresponding to the external diameter of branch B, to form near hole 26. By driving such a drill through main A at the angle branch B is to assume with respect thereto, the two holes 25 and 26 will be of the proper shape respectively to fit the reduced tip end 29 of stem 27 and the end of branch B. Stem 27 is formed as described in connection with Figs. 1 to 4. Its enlarged cylindrical inner section or base 28 fits and is secured within the bore of branch B while its frusto-cone shape intermediate section 30 and its reduced cylindrical tip section 29 project beyond the end thereof.

After the main section A and branch section B are assembled, the tip 29 of stem 27 is brazed or welded to the wall of main A about far hole 25 and the joint may be finished by grinding down and polishing the projecting tip 29 to conform to the curvature of main A.

Figs. 11 and 12 show a modified arrangement and method which in one respect conforms to the usual practice heretofore followed, viz., that the end of the abutting or branch member is shaped to conform to the surface of the other or main member against which it abuts. Where, as illustrated, the two members to be joined are cylindrical tubes arranged at right angles to each other, the main A is perforated by two coaxial diametrically opposite holes (a far hole 45 and a near hole 46) of the same diameter, which is considerably less than the diameter of branch B. The end of branch B is cut to conform to the curved surface of main A and a stem 47 is inserted into and secured within the bore thereof. Stem 47 is provided with a projecting tip 49 of a size snugly to fit holes 45 and 46 and with a base 48 adapted snugly to fit like a plug within the bore of branch B so that it may be easily and firmly secured therein by brazing, welding, or in any other appropriate manner.

According to this modification the projecting tip 49 of the stem of branch B is inserted through the holes in main A and the tubes are brought together until the curved end edge of branch B contacts or comes flush with the correspondingly curved surface of main A. Then the end of stem-tip 49 is welded or otherwise securely anchored to the wall of tube A surrounding far hole 45 therethrough; after which, as previously described, the excess metal projecting beyond the surface of main A may be ground and polished down flush with the surface of main A to finish the joint.

If it is desired that the joints be so made that fluids may flow therethrough between the joined tubes, it is only necessary to provide the plug with passages 50 extending therethrough as illustrated in Figs. 11 and 12.

If desired, the intermediate section of the stem used in any of the cylindrical main type of joints may be made spherical instead of frusto-conical so that it will fit against the inner curved surface of the bore of the main tube section. Such a construction will add strength to the joint, because the strains can be distributed over a greater area of the main section.

While I have herein illustrated and explained my invention as applied to and embodied in joints between main and branch members of circular and of square cross-sections only, it will be readily understood by those skilled in the art that it is applicable to and capable of embodiment in joints between members of other cross-sectional shapes.

In the following claims the words "welding", "weld", "welded" etc. are used to signify not only welding in its ordinary sense, but also brazing and soldering and other equivalent means and methods of securely uniting the stem of the branch member to the wall of the main member.

Having thus illustrated and described the nature and typical embodiments of my invention, what I claim and desire to secure by United States Letters Patent is as follows:

1. A joint comprising a metallic main tube; and a metallic branch tube intersecting the side of the main tube, said branch tube having a metallic plug fitted and anchored in the bore thereof and protruding from the end thereof as an axial stem with a tip of reduced cross section and said main tube having through opposite walls thereof a near hole of a size substantially to fit the end of the branch tube and a far hole of a size substantially to fit the reduced tip of the branch tube stem, said holes aligning on a common axis which is related to the axis of the main tube at the angle of intersection, the end of the branch tube being inserted into the near hole of the main tube to the point where it is throughout at least substantially flush with the adjacent surface of the main tube and the reduced tip of the stem thereof projects into the far hole of the main tube; and a weld anchoring the tip of the branch tube stem to the wall of the main tube adjacent the far hole therethrough.

2. An unsleeved co-planar joint between a cylindrical stem tube and a cylindrical cross tube of equal diameter therewith, and characterized by geometric regularity of surface conformation to the exclusion of enlargements or depressions, comprising a pair of openings through opposite walls of the cross tube and co-axial with the stem tube, the inner hole being of substantially the size of the axial projection of the cylindrical periphery of the stem tube and the far hole being of considerably smaller diameter, a full-diametered end of the stem tube fitting into and filling the near hole, and a reduced solid ended terminal extension of the stem tube fitted into and filling the far hole flush with the adjacent periphery of the cross tube.

3. An unsleeved co-planar joint between a cylindrical stem tube and a cylindrical cross tube of equal diameter therewith, and characterized by geometric regularity of surface conformation to the exclusion of enlargements or depressions, comprising a pair of openings through opposite walls of the cross tube and co-axial with the stem tube, the inner hole being of substantially the size of the axial projection of the cylindrical periphery of the stem tube and the far hole being of considerably smaller diameter, a full-diametered end of the stem tube fitting into and filling the near hole, and a reduced solid ended terminal extension of the stem tube fitted into and filling the far hole flush with the adjacent periphery of the cross tube, the portion between the far hole entrant end of the extension and the near hole entrant full-diametered end of the stem tube being of generally conical conformation which forms an abutment cooperating with the margin of the near hole for limiting inward axial movement of the stem tube.

4. In a joint, the combination comprising, a pair of tubular metallic members secured together so that the end of one tubular member abuts the near wall of the other tubular member, and means wholly within the limits of the outer surfaces of the tubular members for securing them together, said means including a metal plug fitted into and secured to the end of one of the tubular members and having a projecting portion of reduced section extending through the other tubular member and secured thereto, said portion of reduced section extending to the outer surface of the far wall of said other tubular member and being flush therewith.

GEORGE F. HAUF.